US005941678A

United States Patent [19]

Saito

[11] Patent Number: 5,941,678

[45] Date of Patent: Aug. 24, 1999

[54] OVERHEAD TRAVELING CARRIER SYSTEM FOR SPEEDILY CONVEYING LOAD AND METHOD OF CONTROLLING THEREOF

[75] Inventor: Daisuke Saito, Yamagata, Japan

[73] Assignee: NEC Corporation, Tokyo, Japan

[21] Appl. No.: 08/895,406

[22] Filed: Jul. 16, 1997

[30] Foreign Application Priority Data

Jul. 16, 1996 [JP] Japan .................................... 8-185840

[51] Int. Cl.[6] ...................................................... B65G 63/00

[52] U.S. Cl. ............................................ 414/626; 414/814

[58] Field of Search .................................... 414/626, 662, 414/814, 542, 543, 250; 212/319, 329

[56] References Cited

U.S. PATENT DOCUMENTS

| | | | |
|---|---|---|---|
| 2,708,715 | 5/1955 | Meyers | 212/329 X |
| 2,861,700 | 11/1958 | James | 212/319 X |
| 2,933,198 | 4/1960 | Firestone et al. | 212/319 |
| 3,021,963 | 2/1962 | Kasdorf et al. | 212/319 |
| 3,884,363 | 5/1975 | Ajlouny | 414/626 |
| 3,888,360 | 6/1975 | Ando et al. | 414/662 |
| 3,888,362 | 6/1975 | Fletcher et al. | 414/626 X |
| 3,973,683 | 8/1976 | Keller | 414/626 X |
| 4,496,063 | 1/1985 | Ishii et al. | 414/626 X |
| 4,538,954 | 9/1985 | Luebke | 212/319 X |
| 4,609,323 | 9/1986 | Blaseck et al. | 212/319 X |
| 5,017,075 | 5/1991 | Block | 212/319 X |

FOREIGN PATENT DOCUMENTS

| | | |
|---|---|---|
| 100 944 | 2/1984 | European Pat. Off. . |
| 198329 | 10/1986 | European Pat. Off. . |
| 63-31958 | 2/1988 | Japan . |
| 63-133545 | 9/1988 | Japan . |
| 2140777 | 12/1984 | United Kingdom . |
| 2168938 | 7/1986 | United Kingdom . |
| 2196593 | 5/1988 | United Kingdom . |

*Primary Examiner*—David A. Bucci

[57] ABSTRACT

An overhead traveling carrier system carries a package along a rail supported by a roof, and stops a vehicle at a target position; when the vehicle of the overhead traveling carrier system enters an area around the target position, the overhead traveling carrier system stops the vehicle, and changes the relative position between the vehicle and a handling unit mounted on the vehicle during the downward motion of the handling unit toward the destination, thereby speedily aligning the package with the destination.

11 Claims, 9 Drawing Sheets

OVERHEAD TRAVELING CARRIER SYSTEM FOR SPEEDILY CONVEYING LOAD AND METHOD OF CONTROLLING THEREOF

FIELD OF THE INVENTION

This invention relates to an overhead traveling carrying technology and, more particularly, to an overhead traveling carrier system and a method for controlling thereof.

DESCRIPTION OF THE RELATED ART

The overhead traveling carrier system is, by way of example, installed in a manufacturing facility. FIGS. 1 and 2 illustrate a typical example of the overhead traveling carrier system. The prior art overhead traveling carrier system comprises a rail 1*a* attached to a roof (not shown), a vehicle 1*b* suspended from the rail 1*a* by means of wheels 1*c* and a handling mechanism 1*d* suspended from the vehicle 1*b* by means of wires 1*e*. The rail 1*a* passes over several destinations where packages are to be loaded and unloaded, and the vehicle 1*b* moves the handling mechanism 1*d* to the destinations. The handling mechanism 1*d* loads and unloads the packages at the destinations.

The vehicle 1*b* further includes a linear induction motor unit (not shown) and a winding mechanism 1*f*, and the linear induction motor unit drives the wheels 1*c* for rotation, and the wheels 1*c* roll along the rail 1*a*. The winding mechanism 1*f* winds up the wires, and releases them therefrom.

When the wires 1*e* are wound on the winding mechanism 1*f*, the load handling mechanism 1*d* is lifted from a floor 2, and stays at a home position close to the vehicle. The vehicle 1*b* moves the handling mechanism 1*d* to the destinations together with a package 3.

The handling mechanism 1*d* includes a table 1*g*, fixed to the wires 1*e* and an arm 1*h* for retaining the package 3. The table 1*g* supports the arm 1*h* and the package 3, and is moved between the home position and a working position close to the floor 2.

When the vehicle 1*b* releases the wires 1*e* from the winding mechanism 1*f*, the table 1*d* is downwardly moved from the home position toward the working position, and stays around the floor 2. Then, the arm 1*h* loads and uploads the package.

Upon completion of the loading work or the unloading work, the vehicle 1*b* winds up the wires 1*e*, and the handling mechanism 1*d* returns to the home position. Then, the vehicle 1*b* energizes the linear induction motor unit, and the wheels 1*c* rolls along the rail 1*a* toward the next destination.

When the vehicle 1*b* arrives at the destination 4 (see FIG. 1), the vehicle 1*b* unwinds the wires 1*e* from the winding mechanism 1*f*, and the handling mechanism 1*d* reaches the working position close to the floor 2 (see FIG. 2). Then, the arm 1*h* unloads the package 3, and places it on the destination 4.

Though not shown in FIGS. 1 and 2, a controller is provided for the prior art overhead traveling carrier system, and controls the prior art overhead traveling carrier system at the destination 4 as follows.

FIG. 3 illustrates the controlling sequence executed by the controller. When the vehicle 1*b* arrives around the destination as by step SP1, the controller instructs the vehicle 1*b* to stop the wheels 1*c* as by step SP2, and checks the current position to see whether or not the vehicle stops at the target point over the destination 4. If the current position is deviated from the target position, the controller instructs the vehicle 1*b* to correct the current position as by step SP3.

When the current position is matched with the target position, the controller receives a report representative of the completion of the correction as by step SP4, and instructs the vehicle 1*b* to downwardly move the handling mechanism 1*d* as by step SP5.

The handling mechanism 1*d* is downwardly moved together with the package 3, and places the package at the destination 4. The handling mechanism 1*d* releases the package 3 as by step SP6. Then, the controller instructs the vehicle 1*b* to wind the wires 1*e*, and the handling mechanism 1*d* is lifted toward the vehicle 1*b*. When the handling mechanism 1*d* reaches close to the vehicle, the controller instructs the vehicle 1*b* to return to the next position.

However, a problem is encountered in that the prior art overhead traveling carrier system can not speedily convey the package 3.

SUMMARY OF THE INVENTION

It is therefore an important object of the present invention to provide an overhead traveling carrier system, which conveys a load speedily.

It is also an important object of the present invention to provide a method for controlling the overhead traveling carrier system to speedily convey a load.

The present inventor contemplated the problem, and noticed that the correction of position consumed a long time. This is because of the fact that total weight of the vehicle 1*b*, the handling mechanism 1*d* and the package 3 was so heavy. Another reason was that the wires 1*e* were liable to swing the handling mechanism during the unwinding motion.

To accomplish the object, the present inventor proposes to match a current position with a target position through a relative motion between a vehicle and a handling mechanism.

In accordance with one aspect of the present invention, there is provided an overhead traveling carrier system for conveying an object between destinations, comprising a path extending over the destinations; a vehicle moving along the path; a handling unit supported by the vehicle, and having a retainer movable between a working position closer to the destinations for loading and unloading the object and a home position closer to the vehicle for carrying the object between the destinations; a primary aligner monitoring a first relative relation between a current position of the vehicle and an actual position of each of the destinations so as to stop the vehicle around the actual position; and a secondary aligner monitoring a second relative relation between a current position of the handling unit and the actual position so as to align the handling unit with each of the destinations after the primary aligner stops the vehicle around the actual position.

In accordance with another aspect of the present invention, there is provided a method of controlling an overhead traveling carrier system, comprising the steps of: checking a current position of a vehicle to see whether or not the vehicle enters into an area around a target position; stopping the vehicle when the vehicle enters into the area; changing a relative position between the vehicle and a handling unit movably supported by the vehicle so as to align the handling unit with the target position while the handling unit is being released from a home position closer to the vehicle toward a working position closer to a destination at the target position; and loading or unloading an object at the destination.

BRIEF DESCRIPTION OF THE DRAWINGS

The features and advantages of the overhead traveling carrier system and the method will be more clearly understood from the following description taken in conjunction with the accompanying drawings in which.

DESCRIPTION OF THE PREFERRED EMBODIMENTS

Figure 1:
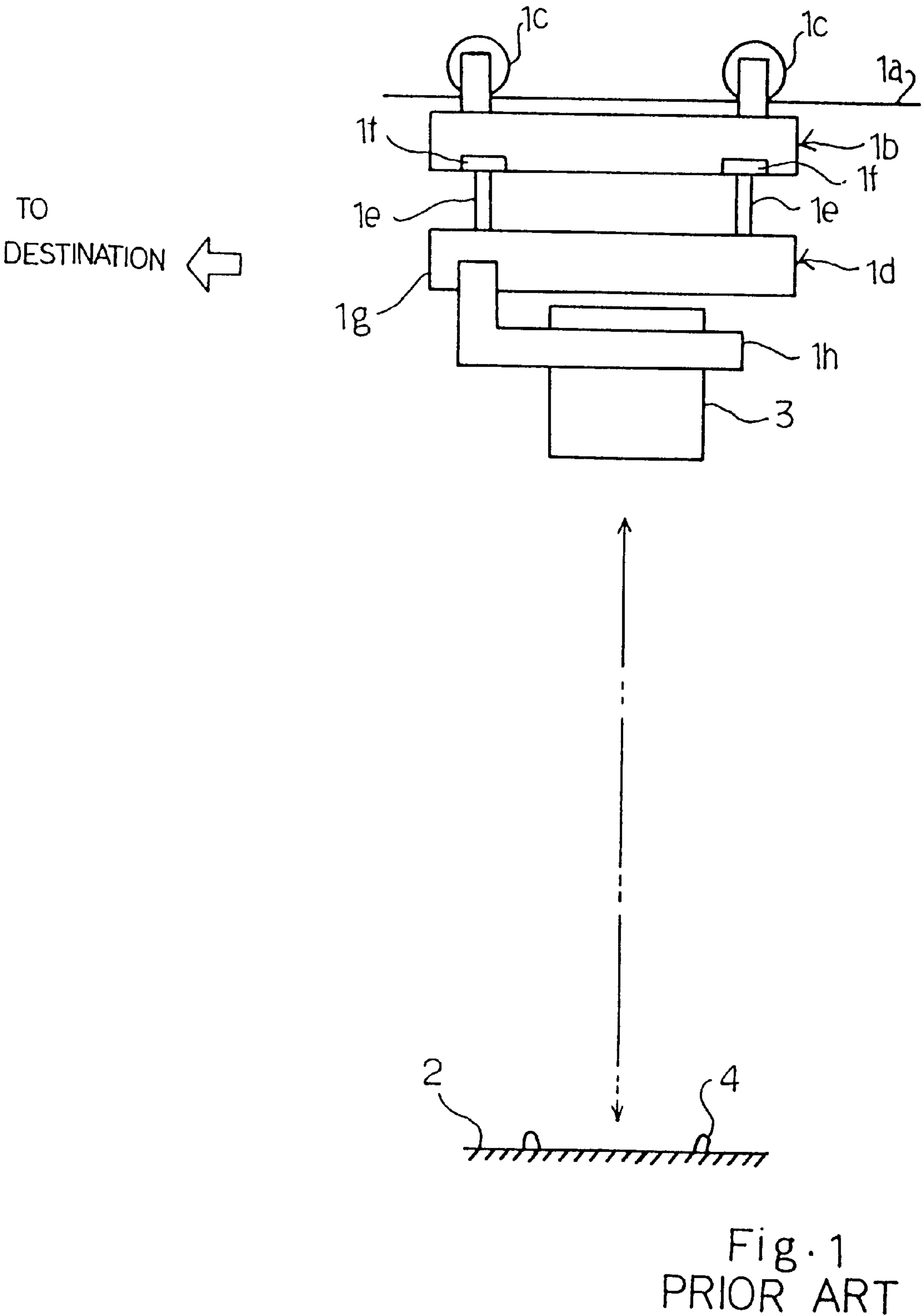
Fig. 1 PRIOR ART
FIG. 1 is a schematic view showing the prior art overhead traveling carrier system at the home position.
Figure 2:
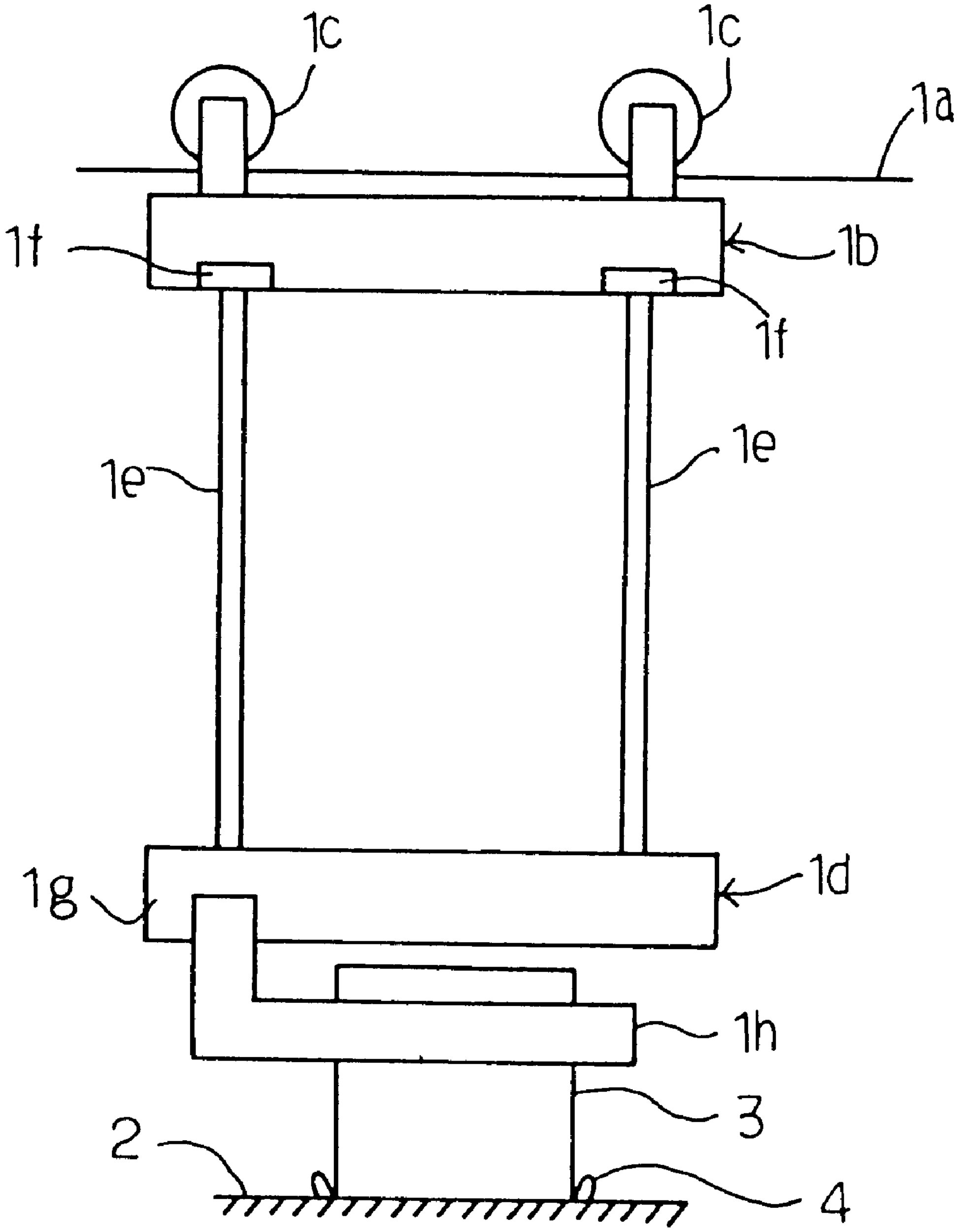
Fig. 2 PRIOR ART
FIG. 2 is a schematic view showing the prior art overhead traveling carrier system at the working position.
Figure 3:
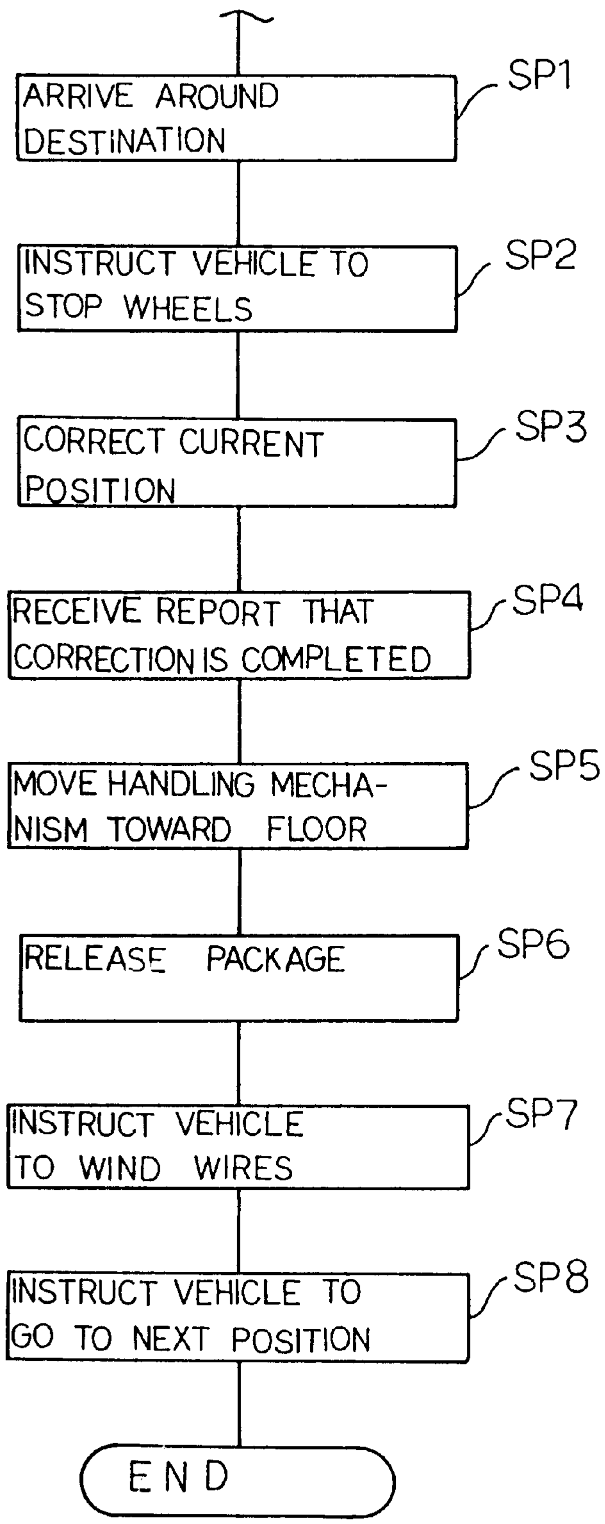
Fig. 3 PRIOR ART
FIG. 3 is a flowchart executed by the controller during the unloading work.
Figure 4:
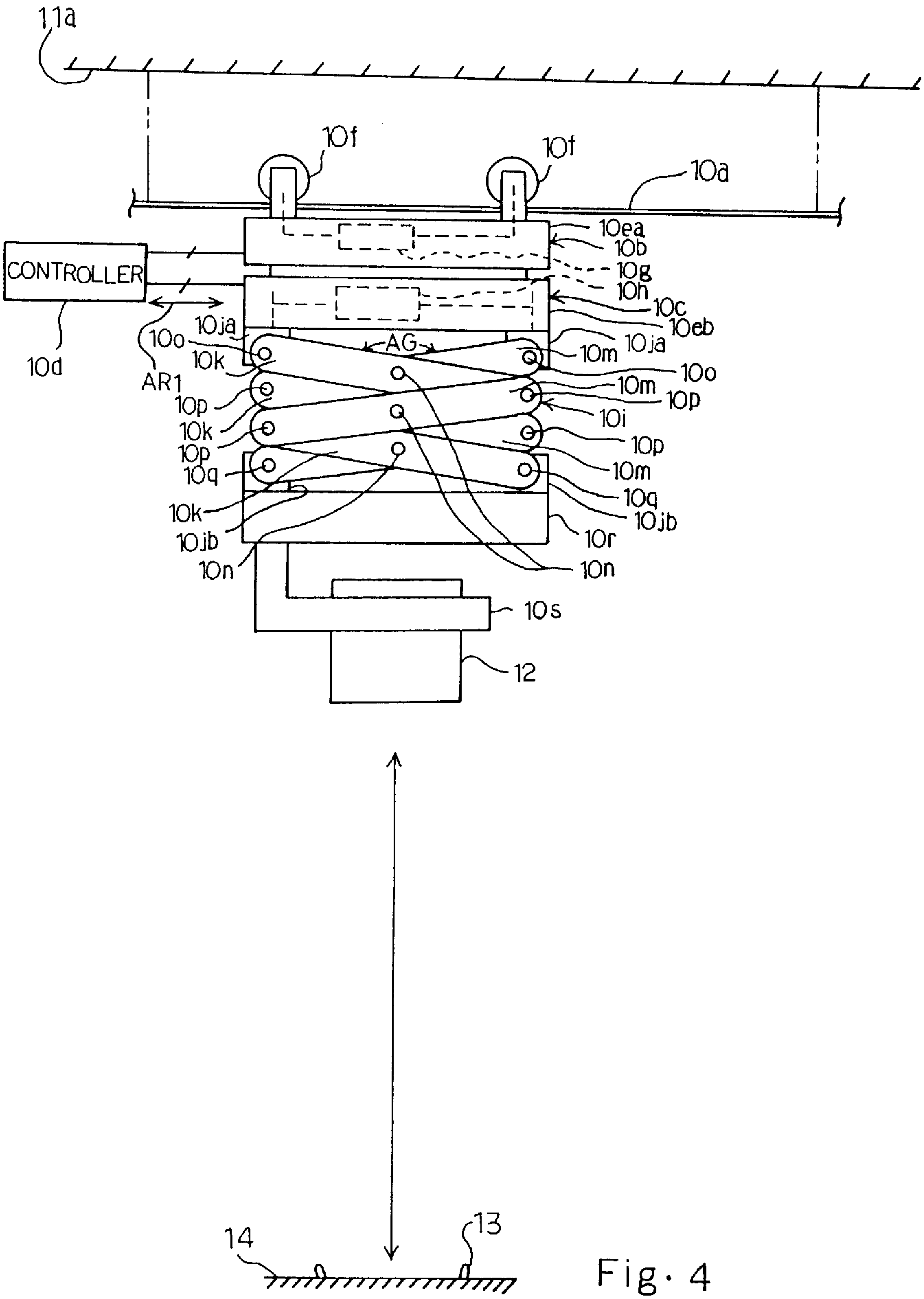
FIG. 4 is a schematic view showing an overhead traveling carrier system at a home position.
Figure 5:
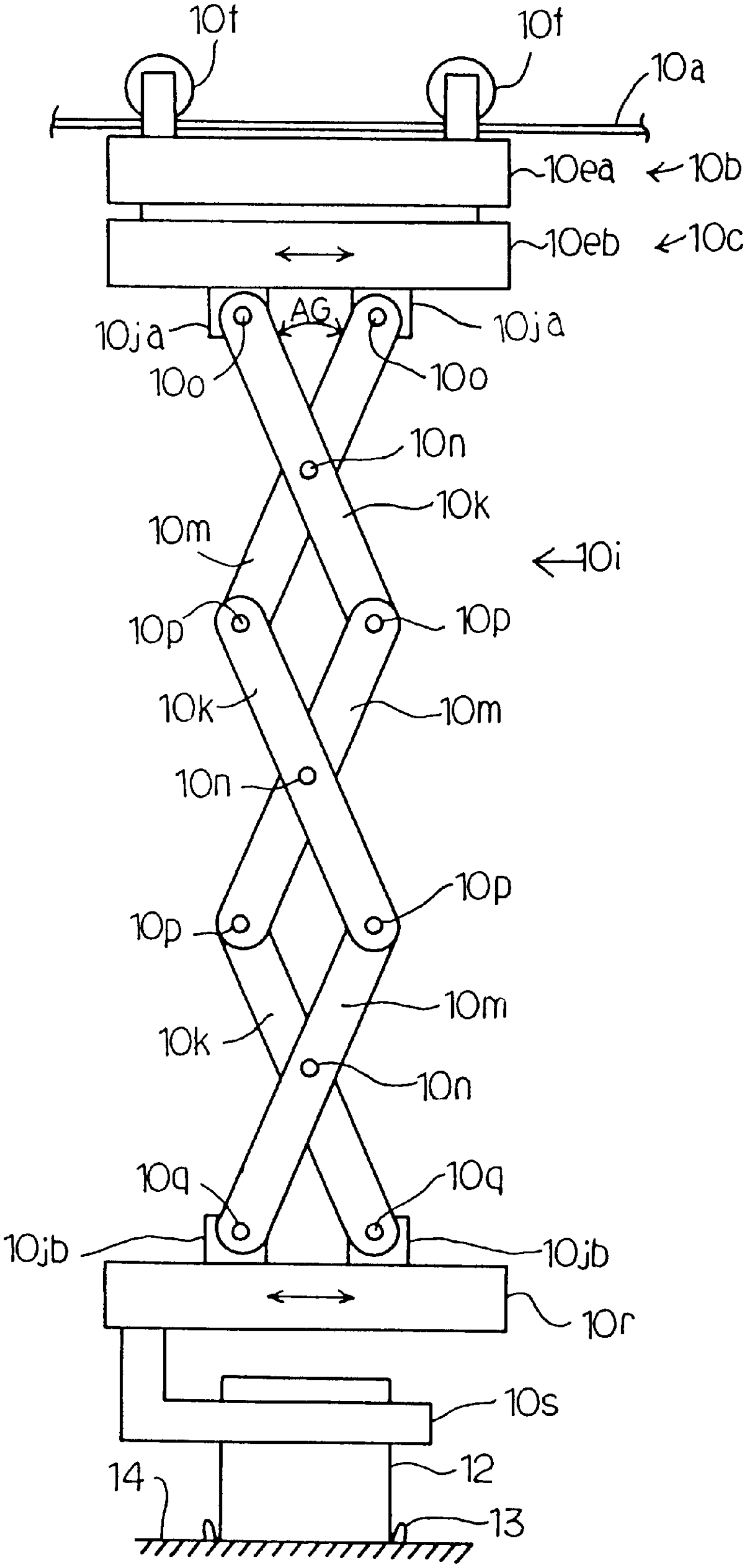
FIG. 5 is a schematic view showing the overhead traveling carrier system at a working position.

Referring to FIGS. 4 and 5 of the drawings, an overhead traveling carrier system embodying the present invention largely comprises a rail 10*a* attached to a roof of a manufacturing facility, a vehicle 10*b* movable along the rail 10*a* in a first direction, a handling mechanism 10*c* movable in a direction parallel to the first direction for loading and unloading a package 12 and a controller 10*d* for controlling the vehicle 10*b* and the handling mechanism 10*c*. The package 12 is loaded by the loading mechanism at a working position (see FIG. 5), and the vehicle 10*b* conveys the handling mechanism 10*c* together with the package 12 at a home position (see FIG. 4) from the loading area to an unloading area.

The vehicle 10*b* includes a frame 10*ea*, wheels 10*f* suspending the frame 10*ea* from the rail 10*a* and an electric motor unit 10*g* driving the wheels 10*f*. When the controller 10*d* instructs the vehicle 10*b* to energize the electric motor 10*g*, the wheels 10*f* are driven for rotation by the electric motor unit 10*g*, and roll along the rail 10*a* in either direction depending upon the instruction of the controller 10*d* as indicated by arrow AR1.

The handling mechanism 10*c* includes a frame 10*eb*, an electric motor unit 10*h* accommodated in the frame 10*eb*, a multiple-link lifter 10*i* attached to the lower surface of the frame 10*eb* and two pairs of sliders 10*ja*/10*jb* connected between the electric motor unit 10*b* and the multiple-link lifter 10*i*. The multiple-link lifter 10*i* is implemented by a plurality of pairs of links 10*k*/10*m*. The links 10*k* crosses the associated links 10*m*, and are rotatably connected thereto by means of pins 10*n* at intermediate points thereof, respectively. The pair of links 10*k*/10*m* closest to the frame 10*eb* is rotatably connected to the pair of sliders 10*ja* at upper ends thereof by means of pins 10*o*, and each pair of links 10*k*/10*m* is rotatably connected to another pair of or the other pairs of links 10*k*/10*m* at upper/lower ends thereof by means of pins 10*p*.

The pair of links 10*k*/10*m* farthest from the frame 10*e* is rotatably connected to the other pair of sliders 10*jb* by means of pins 10*q*.

The electric motor unit 10*h* is bi-directionally rotated so that the sliders 10*ja* are approached to and spaced from each other. When the sliders 10*ja* are spaced from each other, the sliders 10*ja* make the angle AG between the links 10*k* and 10*m* large, and the pairs of links 10*k*/10*m* minimize the length as shown in FIG. 4. On the other hand, when the sliders 10*ja* are close to each other, the angle AG is decreased, and the length of the pairs of links 10*k*/10*m* is maximized as shown in FIG. 5. The pairs of links 10*k*/10*m* transfer the angle AG between the pair of sliders 10*ja* and the other pair of sliders 10*jb*, and positions the pair of sliders 10*jb* at the corresponding position of the pair of sliders 10*ja*.

The handling mechanism 10*c* further includes a table 10*r* supporting the sliders 10*jb*, an arm 10*s* supported by the table 10*r* for retaining the package 12. When the pairs of links 10*k*/10*m* minimize the length, the handling mechanism 10*c* enters into the home position, and the table 10*r* and the arm 10*s* are lifted to the closest position to the vehicle 10*b*. On the other hand, when the pairs of links 10*k*/10*m* maximizes the length, the handling mechanism 10*c* reaches the working position, and the package 12 is loaded or unloaded by means of the arm 10*s*.

Figure 6:
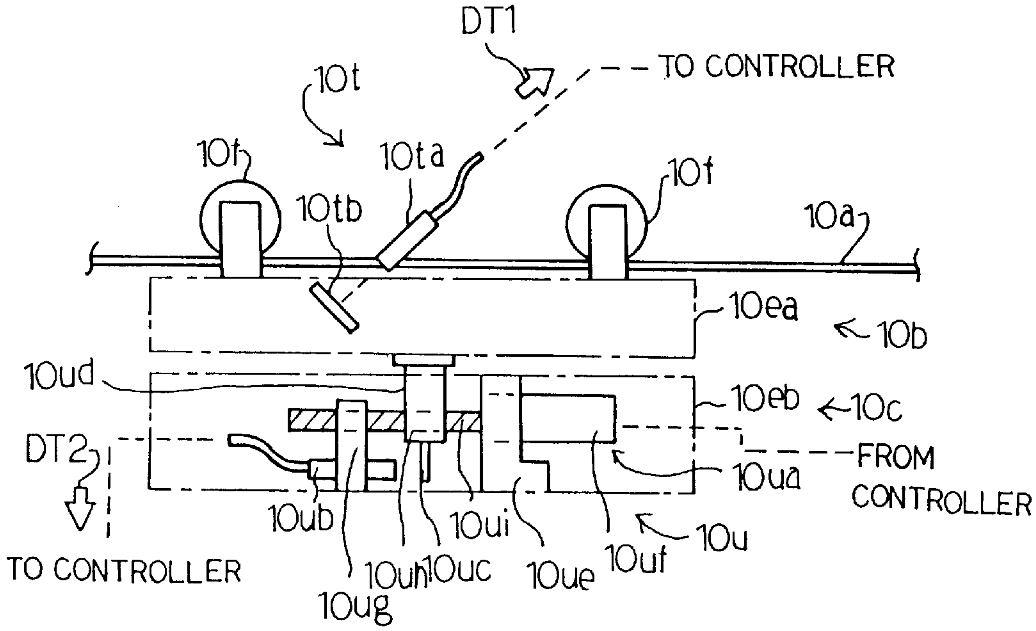
FIG. 6 is a side view showing a position aligner incorporated in the overhead traveling carrier system.
Figure 7:
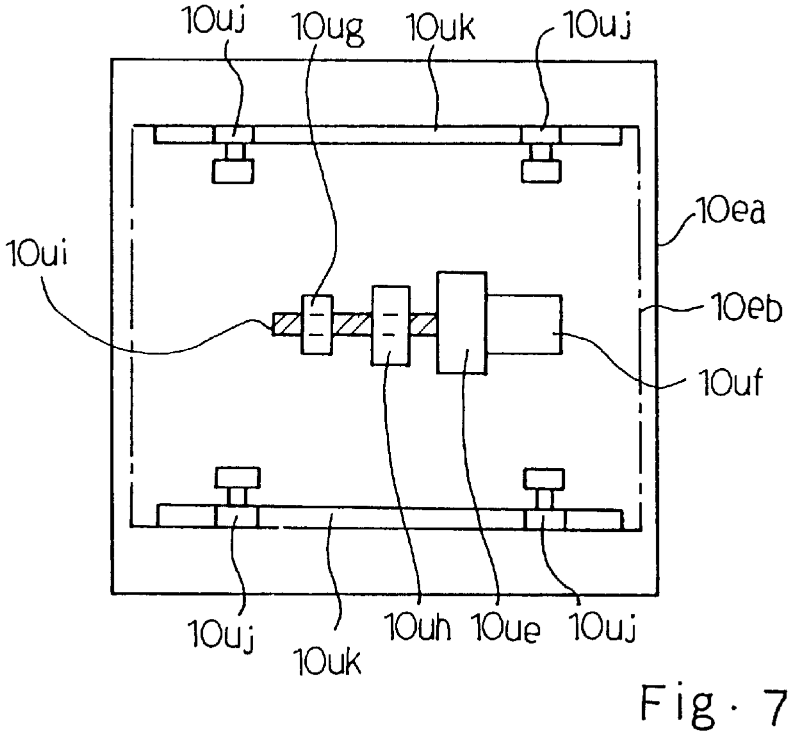
FIG. 7 is a bottom view showing the aligner.

Turning to FIGS. 6 and 7 of the drawings, the overhead traveling carrier system further comprises a first aligner 10*t* for roughly aligning the vehicle 1*b* in a first direction with the target position of a destination 13 on a floor 14 and a second aligner 10*u* for precisely aligning the arm 10*s* in a direction parallel to the first direction and, accordingly, the package 12 with the position of the destination.

The first aligner 10*t* includes a non-contact sensor 10*ta* fixed to a side surface of the rail 10*a* and a reference mark 10*tb* attached to the frame 10*ea*. The non-contact sensor 10*ta* monitors a trajectory of the vehicle 10*b* to see whether or not the reference mark 10*tb* arrives at a predetermined area in front of the non-contact sensor 10*ta*. The predetermined area is defined in the vicinity of a target position over the destination 13. When the reference mark 10*tb* enters into the predetermined area, the non-contact sensor 10*ta* changes the potential level of a detecting signal DT1 supplied to the controller 10*d*, and the controller 10*d* acknowledges the entry into the predetermined area. When the vehicle 10*b* enters into the predetermined area, the controller 10*d* instructs the electric motor 10*g* to stop the wheels 10*f*. Thus, the first aligner 10*t* and the controller 10*d* as a whole constitute a primary aligner.

The second aligner includes a linear motion mechanism 10*ua* connected between the frames 10*ea* and 10*eb*, a non-contact sensor 10*ub* stationary with respect to the frame 10*eb* and a reference mark 10*uc* stationary with respect to the frame 10*ea*. The non-contact sensor 10*ub* monitors the reference mark 10*uc* to produce a detecting signal DT2 representative of the distance between the non-contact sensor 10*ub* and the reference mark 10*uc*. Upon entry into the predetermined area, the controller 10*d* calculates a correction for the precise alignment between the current position of the handling mechanism 10*c* and the target position, and instructs the linear motion mechanism 10*ua* to move the handling mechanism 10*c* with respect to the vehicle 10*b* by the given correction. When the controller 10*d* acknowledges that the handling mechanism 10*c* is moved by the correction through the detecting signal DT2, the controller 10*d* instructs the linear motion mechanism 10*ua* to stop there.

The linear motion mechanism 10*ua* includes a first bracket 10*ud* fixed to the frame 10*ea*, a motor mount 10*ue* fixed to the frame 10*eb*, an electric motor unit 10*uf* fixed to the motor mount 10*ue*, a second bracket 10*ug* fixed to the frame 10*eb*, a ball thread 10*uh* snugly received in a hole formed in the first bracket 10*ud* and a threaded rod 10*ui* engaged with the ball thread 10*uh*. The threaded rod 10*ui* is connected at one end thereof to the rotor of the electric motor unit 10*ua,* and the other end portion of the threaded rod 10*ui* is rotatably supported by the second bracket 10*ug*. The non-contact sensor 10*ub* is supported by the second bracket 10*ug,* and the reference mark 10*uc* is fixed to the first bracket 10*ud.*

The linear motion mechanism 10*ua* further includes rollers rotatably supported by the frame 10*eb* at the four corners and two rails 10*uk* attached to the bottom surface of the frame 10*ea* in parallel to each other. The rollers 10*uj* are engaged with the rails 10*uk,* and roll along the rails 10*uk*. As a result, the frame 10*eb* is bi-directionally moved with respect to the frame 10*ea*.

When the electric motor unit 10*uf* rotates the threaded rod 10*ui,* the ball thread 10*uh* converts the rotation of the threaded rod 10*ui* to a thrust, and the thrust moves the handling mechanism 10*c* in one direction. On the other hand, when the electric motor unit 10*uf* rotates the threaded rod 10*ui* in the opposite direction, the threaded rod 10*ui* and the ball thread move the handling mechanism 10*c* in the opposite direction. Thus, the second aligner 10*u* and the controller 10*d* as a whole constitute a secondary aligner.

Figure 8A:
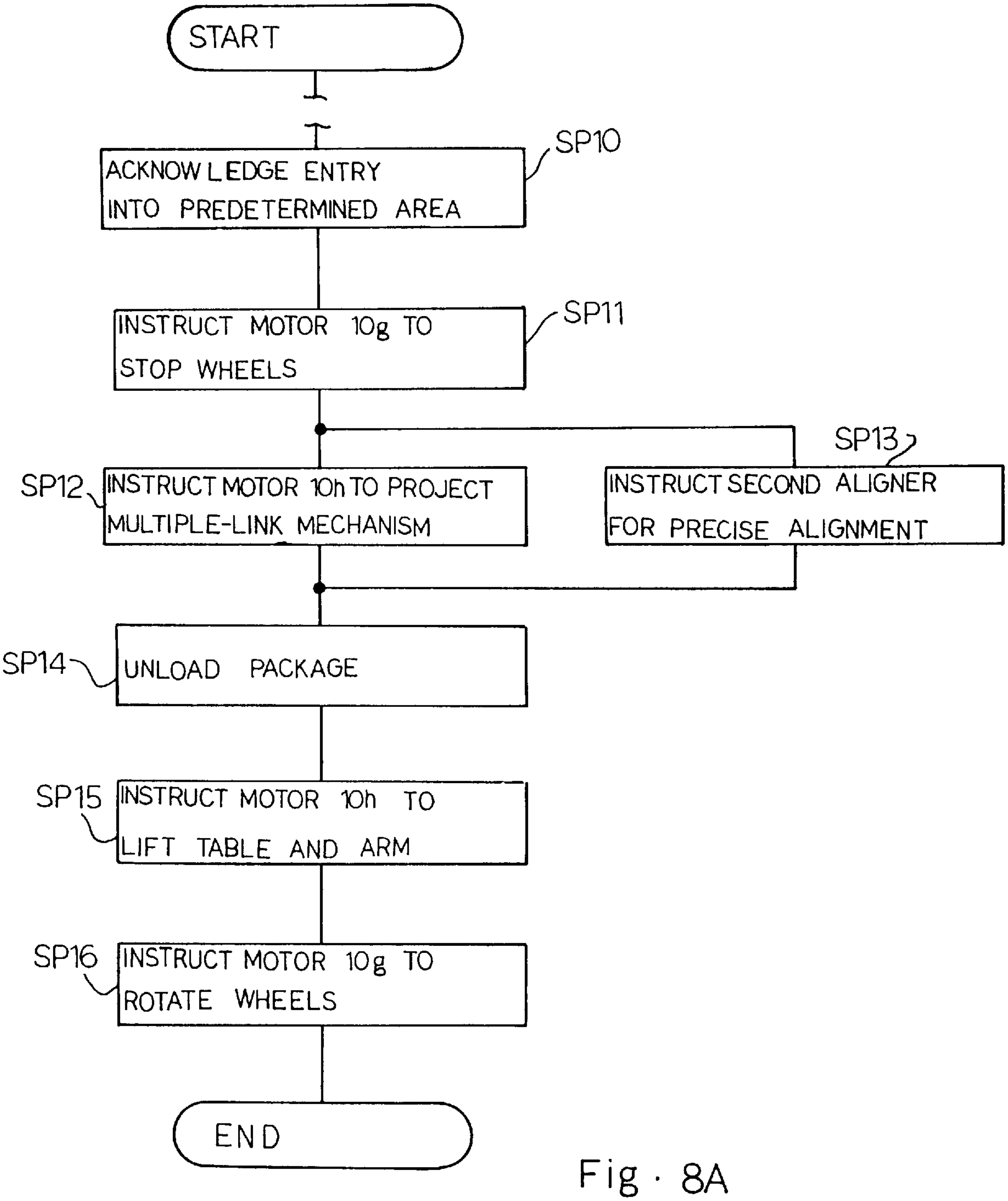
FIGS. 8A and 8B are flowcharts showing a program sequence executed by a controller incorporated in the overhead traveling carrier system.
Figure 8B:
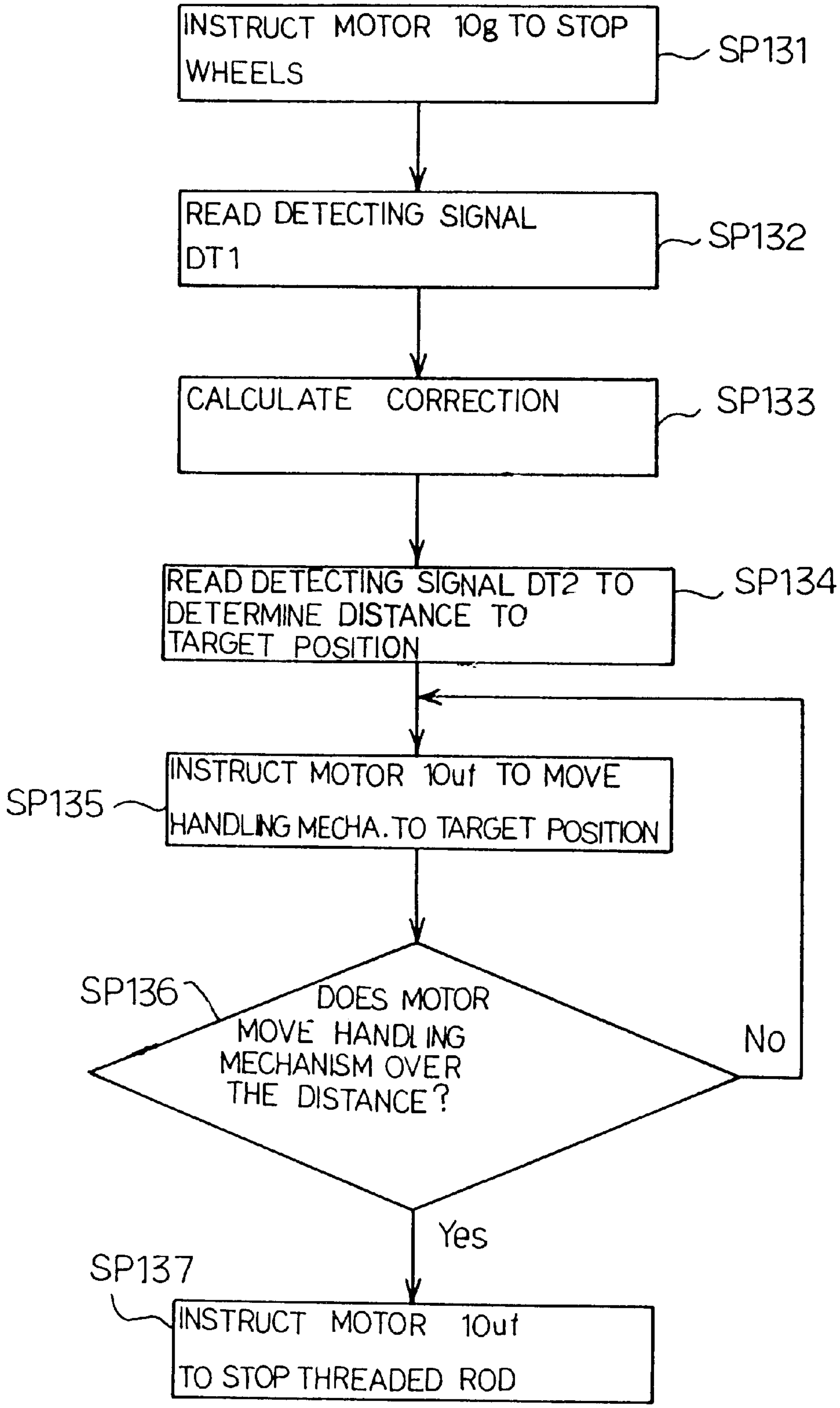

Description is made on the controlling sequence with reference to FIGS. 8A and 8B. Assuming now that the vehicle 10*b* conveys the package 12 toward the destination 13, the controller 10*d* periodically checks the detecting signal DT1 to see whether or not the vehicle enters the predetermined area around the target position. When the non-contact sensor 10*ta* changes the potential level of the detecting signal DT1, the controller 10*d* acknowledges the entry into the predetermined area as by step SP10, and instructs the electric motor unit 10*g* to stop the wheels 10*f* as by step SP11.

Subsequently, the controller 10*d* instructs the electric motor 10*h* to project the multiple-link mechanism 10*i* as by step SP12, and instructs the second aligner 10*u* for a precise alignment as by step SP13. Thus, the handling mechanism 10*c* is precisely aligned with the target position during the projection of the multiple-link mechanism 10*i*.

The controlling sequence for the precise alignment is illustrated in FIG. 8B. When the vehicle 10*b* enters into the predetermined area, the controller 10*d* instructs the electric motor unit 10*g* to stop the wheels 10*f* as by step SP131, and reads the potential value of the detecting signal DT1 as by step SP132. The controller 10*d* calculates a correction for the precise alignment between the handling mechanism 10I and the destination 13 as by step SP133.

Subsequently, the controller 10*d* reads the detecting signal DT2 to see how far the non-contact sensor 10*ub* is spaced from the reference mark 10*uc* as by step SP134. The controller 10*d* determines the distance over which the handling mechanism 10*c* has to be moved.

The controller 10*d* instructs the electric motor unit 10*uf* to move the handling mechanism by the distance as by step SP135. The controller 10*d* periodically checks the detecting signal DT2 to see whether or not the handling mechanism is moved over the distance as by step SP136. While the answer at step SP136 is given negative, the controller 10*d* returns to step SP135, and reiterates the loop consisting of steps SP135 and 136 until the answer at step SP136 is changed to affirmative.

When the answer at step SP136 is given affirmative, the controller 10*d* instructs the electric motor unit 10*uf* to stop the threaded rod 10*ui* as by step SP137, and the handling mechanism 10*c* is precisely aligned to the target position.

Turning back to FIG. 8A, when the multiple-link mechanism 10*i* maximizes the length thereof, the arm 10*s* reaches the destination 13, and the arm 10*s* unloads the package 12 as by step SP14. The controller 10*d* instructs the electric motor unit 10*b* to lift up the table 10*r* and the arm 10*s* as by step SP15. When the handling mechanism 10*c* returns to the home position, the controller 10*d* instructs the electric motor unit 10*g* to rotate the wheels 10*f* as by step SP16, and the vehicle 10*b* is moved toward the next destination.

As will be appreciated from the foregoing description, only the handling mechanism 10*c* is regulated to the target position, and the electric motor unit 10*uf* speedily moves the handling mechanism 10*c* to the target position. Moreover, the alignment is carried out during the projection of the multiple-link mechanism 10*i,* and the parallel works shrink the time consumed in the unloading operation. Thus, the overhead traveling carrier system according to the present invention speedily conveys the package to the destination.

Second Embodiment

Figure 9:
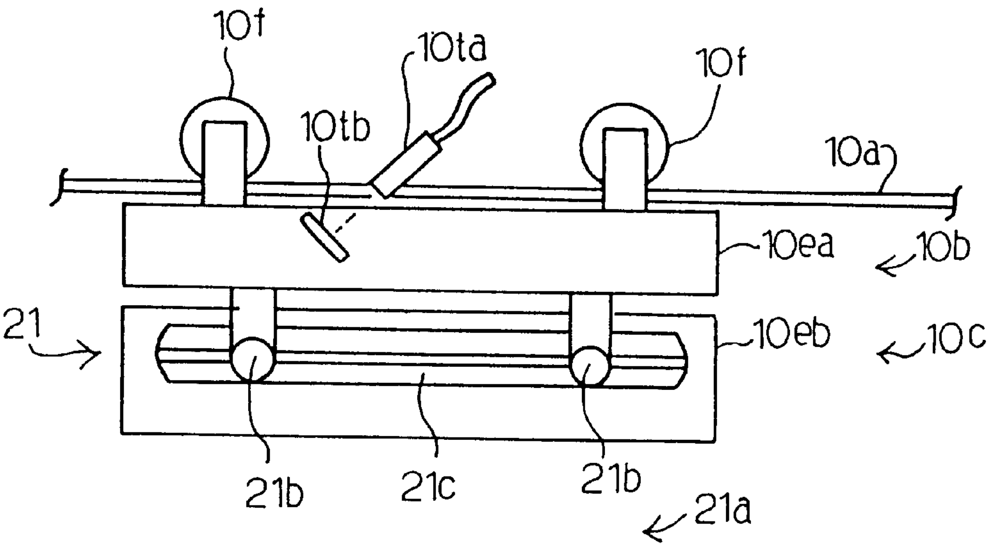
FIG. 9 is a side view showing an aligner incorporated in another overhead traveling carrier system according to the present invention.
Figure 10:
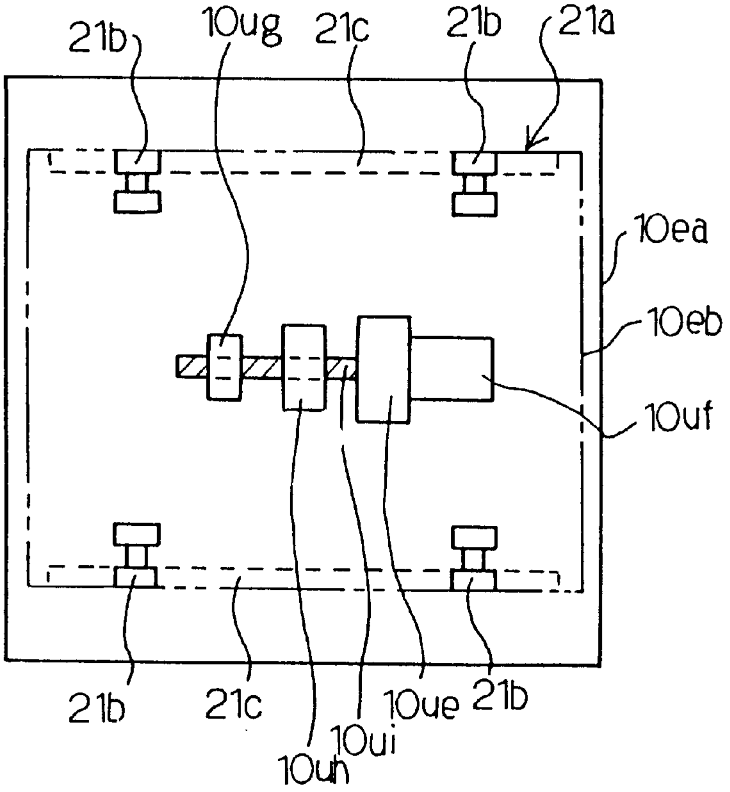
FIG. 10 is a bottom view showing the aligner.

Turning to FIGS. 9 and 10 of the drawings, a second aligner 21 incorporated in another overhead traveling carrier system embodying the present invention is supported by a vehicle. The overhead traveling carrier system implementing the second embodiment is similar to the first embodiment except for a guide mechanism 21*a* of the second aligner 21. For this reason, other components members and units are labeled with the same references designating corresponding members and units of the first embodiment without detailed description.

The guide mechanism 21*a* includes wheels 21*b* rotatably supported by the frame 10*ea* and guide rails 21*c* attached to both side surfaces of the frame 10*eb*. The guide rails 21*c* allows the wheels 21*b* to roll therealong, and the handling mechanism 10*c* is bi-directionally moved with respect to the vehicle 10*b*.

The second embodiment achieves all the advantages of the first embodiment.

What is claimed is:

1. An overhead traveling carrier system for conveying an object between destinations, comprising:

a fixed path extending over said destinations;

a vehicle connected to and moving along said path;

a handling unit supported by said vehicle, and having a retainer movable between a working position closer to said destinations for loading and unloading said object and a home position closer to said vehicle for carrying said object between said destinations;

a primary aligner monitoring a first relative relation in a first direction between a current position of said vehicle and an actual position of a selected one of said destinations along said path to stop said vehicle around said actual position of said selected destination; and a secondary aligner monitoring a second relative relation in said first direction between a current position of said handling unit and said actual position so as to align said handling unit with said selected destination along said path after said primary aligner stops said vehicle around said actual position of said selected destination.

2. The overhead traveling carrier system as set forth in, claim 1, in which said secondary aligner includes a threaded rod rotatably supported by one of said vehicle and said handling unit, a ball thread engaged with said threaded rod and supported by the other of said vehicle and said handling unit, a motor unit connected to said threaded rod for bi-directionally rotating said threaded rod, a position detector for producing a detecting signal representative of said second relative relation, and a controller responsive to said detecting signal to cause said motor unit to align said handling unit with said selected destination.

3. The overhead traveling carrier system as set forth in claim 2, in which said secondary aligner further includes guide rails attached to one of said vehicle and said handling unit, and wheels rotatably supported by the other of said vehicle and said handling unit.

4. The overhead traveling carrier system as set forth in claim 1, in which said primary aligner includes a position detector monitoring a trajectory of said vehicle to see whether or not said vehicle arrives around said actual position and producing a detecting signal representative of the arrival around said actual position, and a controller responsive to said detecting signal to stop said vehicle.

5. The overhead traveling carrier system as set forth in claim 1, in which said handling unit includes a multiple-link mechanism projectable from said home position to said working position and retractable from said working position to said home position.

6. An overhead traveling carrier system for conveying an object between destinations according to claim 1, wherein the secondary aligner moves only the handling unit.

7. An overhead traveling carrier system for conveying an object between destinations, comprising:

a fixed path extending over said destinations;

a vehicle connected to and moving along said path;

a handling unit supported by said vehicle, and having a retainer movable between a working position closer to said destinations for loading and unloading said object and a home position closer to said vehicle for carrying said object between said destinations;

a primary aligner monitoring a first relative relation in a first direction between a current position of said vehicle and an actual position of a selected one of said destinations along said path to stop said vehicle around said actual position of said selected destination; and a secondary aligner monitoring a second relative relation in said first direction between a current position of said handling unit and said actual position so as to align said handling unit with said selected destination along said path after said primary aligner stops said vehicle around said actual position of said selected destination;

wherein said secondary aligner aligns said handling unit with said selected destinations during the movement of said retainer from said home position to said working position.

8. A method of controlling an overhead traveling carrier system, comprising the steps of:

a) checking a current position in a first direction along a path of a vehicle to see whether or not said vehicle enters into an area around a target position;

b) stopping said vehicle when said vehicle enters into said area;

c) changing a relative position along said path between said vehicle and a handling unit movably supported by said vehicle to align said handling unit in said first direction with said target position; and d) loading or unloading an object at said destination.

9. The method as set forth in claim 8, in which said step c) includes the sub-steps of c-1) calculating a correction for the alignment of said handling unit and said target position on the basis of a current position of said vehicle, c-2) instructing said handling unit to change a current position thereof, c-3) checking said current position of said handling unit to see whether or not said handling unit is aligned with said target position, and c-4) repeating said sub-steps c-2) and c-3) until said current position is matched with said target position.

10. A method of controlling as in claim 8, further comprising the step:

releasing said handling unit from a home position closer to said vehicle toward a working position closer to a destination at said target position, said further step being performed concurrently with step c).

11. A method of controlling an overhead traveling carrier system according to claim 8, wherein in step (c) only the handling unit is moved.

* * * * *